United States Patent
Matsuura et al.

(10) Patent No.: US 6,766,957 B2
(45) Date of Patent: Jul. 27, 2004

(54) OPTICAL DEVICE FOR BAR-CODE READING, METHOD FOR MANUFACTURING AN OPTICAL DEVICE, AND LIGHT PROJECTION/RECEIVING PACKAGE

(75) Inventors: Tamiaki Matsuura, Kanagawa (JP); Hidekuni Aizawa, Kanagawa (JP); Shigeru Shinzawa, Tokyo (JP)

(73) Assignee: Sony Corporation (JP)

( * ) Notice: Subject to any disclaimer, the term of this patent is extended or adjusted under 35 U.S.C. 154(b) by 40 days.

(21) Appl. No.: 10/152,864

(22) Filed: May 23, 2002

(65) Prior Publication Data

US 2002/0185541 A1 Dec. 12, 2002

(30) Foreign Application Priority Data

May 25, 2001 (JP) ..................................... P2001-156508
Jun. 19, 2001 (JP) ..................................... P2001-184725

(51) Int. Cl.⁷ ................................................ G06K 7/10
(52) U.S. Cl. ............. 235/462.45; 235/454; 235/462.35; 235/462.32
(58) Field of Search ........................... 235/454, 462.35, 235/462.32; 250/234, 235, 216

(56) References Cited

U.S. PATENT DOCUMENTS

| 4,560,862 A | * | 12/1985 | Eastman et al. | ....... 235/462.22 |
| 4,916,318 A | * | 4/1990 | Iima | ............................ 250/568 |
| 4,941,201 A | * | 7/1990 | Davis | ............................ 455/41 |
| 5,021,651 A | * | 6/1991 | Ishikawa | ..................... 250/239 |
| 5,596,446 A | * | 1/1997 | Plesko | ......................... 359/214 |
| 5,734,157 A | * | 3/1998 | Liou | ............................ 250/216 |
| 5,949,068 A | * | 9/1999 | Stoner et al. | ................ 250/234 |

FOREIGN PATENT DOCUMENTS

| JP | 7-93454 | 7/1995 |
| JP | 11-15910 | 1/1999 |

* cited by examiner

*Primary Examiner*—Michael G. Lee
*Assistant Examiner*—Kimberly Nguyen
(74) *Attorney, Agent, or Firm*—Rader, Fishman & Grauer PLLC; Ronald P. Kananen (57) ABSTRACT

An optical device for bar-code reading capable of improving the degree of freedom in design of component lenses so as to allow free positional adjustment of the lenses while ensuring downsizing and weight reduction of the device, and a method for manufacturing are disclosed. An optical device for bar-code reading comprises a light emitting element; a light projection lens for focusing light from the light emitting element so as to irradiate a bar code; a light receiving lens for focusing reflected light from the bar code and having formed therein a penetrating hole which penetrates a plane of incidence of light and a plane of outgoing of light, in which the light projection lens is inserted; and a light receiving element for receiving the light focused by the light receiving lens so as to perform photo-electric conversion.

12 Claims, 9 Drawing Sheets

LASER LIGHT TOWARDS BAR CODE

REFLECTED LIGHT FROM BAR CODE

OPTICAL DEVICE FOR BAR-CODE READING, METHOD FOR MANUFACTURING AN OPTICAL DEVICE, AND LIGHT PROJECTION/RECEIVING PACKAGE

CROSS REFERENCES TO RELATED APPLICATIONS

The present invention claims priority to its priority documents No. 2001-156508 and No. 2001-184725 filed in the Japanese Patent Office on May 25, 2001 and Jun. 19, 2001, respectively, the entire contents of which are expressly incorporated herein by reference.

BACKGROUND OF THE INVENTION

1. Field of the Invention

The present invention relates to an optical device for bar-code reading and a method for manufacturing thereof, in particular to those capable of improving the individual degrees of freedom in design and positioning accuracy of a light projection lens and a light receiving lens in an integrated constitution and also to a light projection/receiving package for bar-code reading, and in particular for improving the downsizing of the package through minimizing an area for mounting a light emitting element and a receiving element.

2. Description of the Related Art

Many recent shops and factories practice sales management of commodities or production management of products by attaching thereto bar codes indicating digital information of the products and by reading such information through optical scanning thereof. In a general procedure using such kinds of bar codes, light is irradiated to a bar code and reflected light therefrom is processed by photo-electric conversion, depending on the intensity of the reflected light, to thereby decode the information based on a combined pattern of detected signals.

Figure 19:
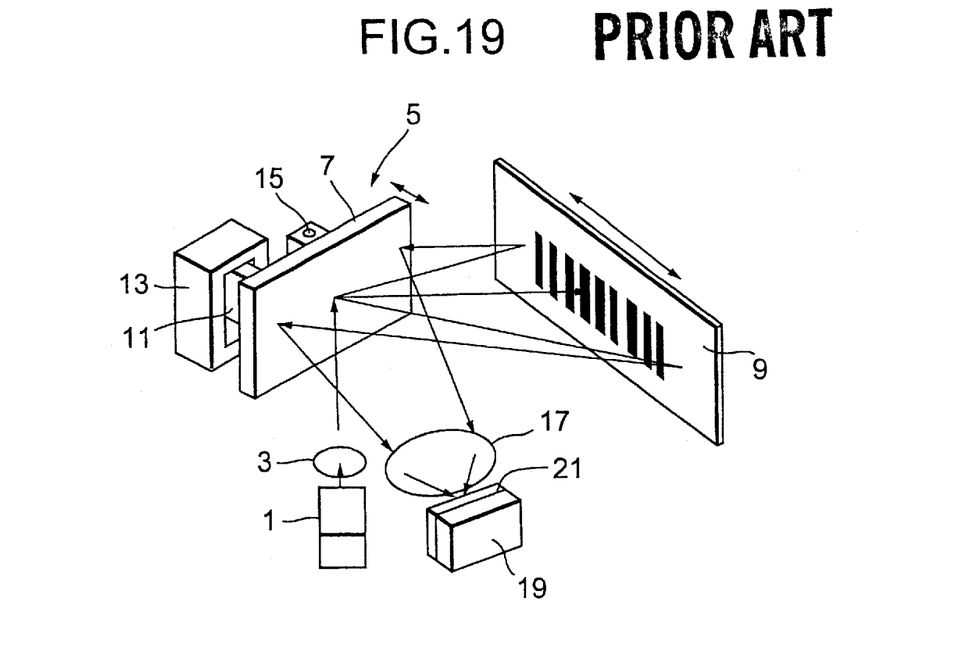
FIG. 19 is a schematic drawing for explaining a conventional optical reading system.

More specifically, as schematically shown in FIG. 19, a light projection lens 3 focuses light emitted from a light emitting element 1, and thus focused light is irradiated to a bar code 9 after being reflected off a mirror 7 of a scan mirror 5. Mirror 7 is swung so as to irradiate the entire area of bar code 9. The swinging of mirror 7 is based on attraction and repulsion of a magnet 11 attached to mirror 7 to or from a drive coil 13 into which magnet 11 is inserted, where drive coil 13 is applied with positive and negative currents inverting at a predetermined cycle to thereby swing mirror 7 around a fulcrum of swinging 15.

The light irradiated on a surface of bar code 9 returns back to mirror 7 with an intensity variation caused by a black-and-white pattern of bar code 9 while being affected by some irregular reflection. A condensing lens 17 then focuses the light reflected there, and a light receiving element 19 electrically converts the intensity variation to produce an output. Light receiving element 19 is provided on a front surface with a band-pass filter (BPF) 21 for improving accuracy in the reading, to thereby successfully prevent unnecessary light having a frequency other than the emission frequency from being caught.

Figure 20:
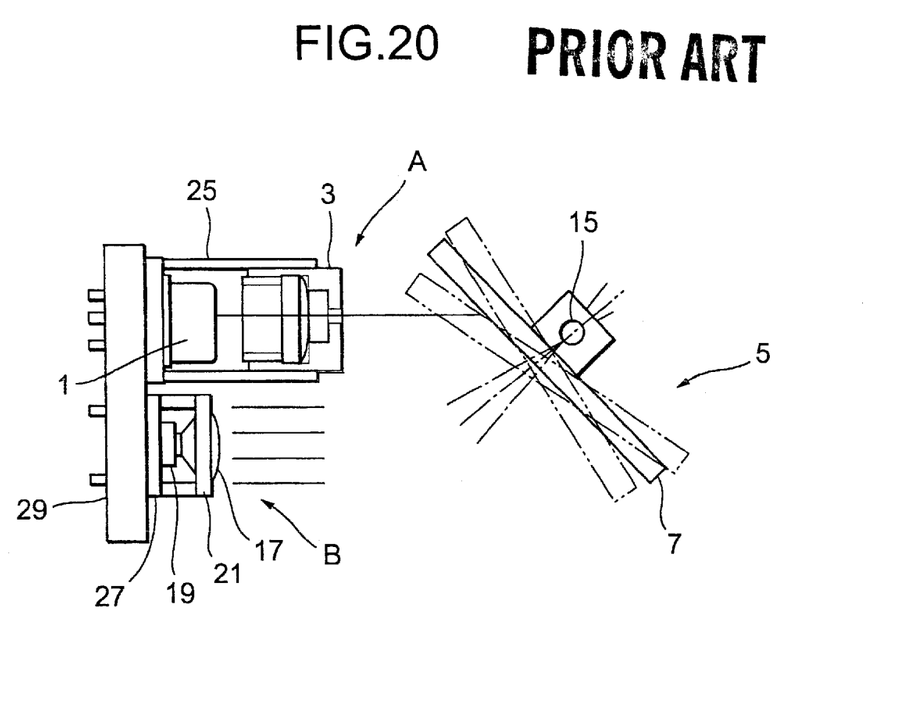
FIG. 20 is a sectional view of a conventional optical device for bar-code reading.

There has been provided an optical device for bar-code reading, as shown in FIG. 20 which materializes such reading systems. As illustrated in FIG. 20, the device comprises a light emitting assembly A having a light emitting element 1 and a light projection lens 3 housed in a casing 25, and a light receiving assembly B having a light receiving element 19, a light receiving lens 17 and a BPF 21 housed in a casing 27, both assemblies being mounted on a substrate 29. Electrical connections within individual casings 25 and 27 are accomplished through wire bonding or the like. Mirror 7 of scan mirror 5 is arranged so as to allow swinging around the fulcrum of swinging 15. Light emitting assembly A, light receiving assembly B and scan mirror 5 are housed in a housing not shown, to thereby form an optical device for bar-code reading.

The foregoing optical device for bar-code reading however, requires a large mounting space and can attain only a limited range of downsizing since light emitting assembly A having light emitting element 1 and the light projection lens 3 housed in casing 25, and light receiving assembly B having, light receiving element 19 and light receiving lens 17 in casing 27 are separately composed.

As measures for solving such non-conformity, there is known a "bar-code reader" as disclosed in Japanese Patent Application Publication No. Hei 7-93454, in which two lens portions are integrated into one transparent lens to thereby downsize a device as a whole, and a "bar-code reading device" as disclosed in Japanese Patent Application Publication No. Hei 11-15910, in which an irradiation lens and an imaging lens are formed using a transparent resin material in an integrated manner to thereby reduce the number of optical parts and save labor for assembly.

While these devices were successful in achieving a certain degree of space saving, it has not been allowable to choose different media as being optimized for the light emitting characteristics and the light receiving characteristics, since the light projection lens portion and the light receiving lens portion are molded in an integrated manner within a single kind of transparent resin used as a medium. It also has been difficult to compose either lens as a compound lens or to provide different coatings for the individual lenses, which has limited the design of such lenses. Still another problem resides in that this kind of integrated mold lens cannot allow movement of either lens once the other lens is properly positioned and fixed, which inhibits precise positioning by finely adjusting positions of both lenses on the light emitting side and the light receiving side.

An electro-optical reading device, as disclosed in, Japanese Patent Application Publication No. Hei 11-326805, is such that it has a semiconductor laser chip (light emitting element) and a photo detector (receiving element) mounted side by side on one surface of a printed circuit board, where all of which are covered with a mold resin member. To the mold resin member, a lens, a prism and an opening are molded in an integrated manner so as to allow the laser light from the semiconductor laser chip to be focused, bent in the optical path thereof and emitted, and, further, having a concave mirror for focusing the returned light towards a photodetector, to thereby achieve downsizing and weight reduction. The device, however, inevitably has a large printed circuit board due to the planar arrangement of the semiconductor laser chip and photo-detector side by side on one surface of the printed circuit board, so that downsizing cannot be attained The present invention was proposed considering the foregoing situation and provides an optical device for barcode reading capable of improving the degree of freedom in design of the component lenses so as to allow free positional adjustment of such lenses while ensuring a small size and light weight of the device per se and a method for manufacturing thereof.

Furthermore, the present invention also was proposed considering the foregoing situation and provides a light projection/receiving package in which keeping an area sufficient for the mounting of either one of a light emitting element and a receiving element enables mounting of the other element to thereby achieve downsizing and weight reduction of the package.

As has been detailed in the above, since the light projection/receiving package according to the second aspect of the present invention is composed so that a light emitting element and a light receiving element are mounted back to back on front and rear planes of a single die pad, it is not necessary to keep both areas for mounting the light emitting element and the light receiving element on one plane (on the same plane) of the die pad. Accordingly, it will be sufficient to use a die pad affording a mounting area for either element requiring a larger mounting area, and this intrinsically allows mounting of the other element on the opposite plane. That is, only a small die pad affording a mounting area for either the light emitting element or the light receiving element allows the mounting of both. This successfully results in downsizing and weight reduction of the

SUMMARY OF THE INVENTION

An optical device for bar-code reading according to a first aspect of the present invention comprises a light emitting element; a light projection lens; a light receiving lens; and a receiving element. The light projection lens focuses light from the light emitting element so as to irradiate a bar code. The light receiving lens focuses reflected light from the bar code and has formed therein a penetrating hole penetrating a plane of incidence of light and a plane of outgoing of light, in which the light projection lens is inserted. The light receiving element receives the light focused by the light receiving lens so as to perform photo-electric conversion.

In the optical device for bar-code reading, a space for mounting the light receiving lens essentially includes a space for mounting the light projection lens by forming a penetrating hole through the light receiving lens and by inserting the light projection lens into the penetrating hole. Accordingly, it is not necessary to provide a mounting space for every lens, which results in downsizing and weight reduction. In addition, it allows the selection of a material and a coating optimized for each lens, to thereby expand the possibilities in design. It also is advantageous in that the positions of the light projection lens and the light receiving lens can be adjusted independently so that positional errors of the individual lenses relative to the individual elements (light emitting element and receiving element) can surely be absorbed.

The optical device for bar-code reading of the first aspect of the invention may be modified so that the light projection lens thereof is a compound lens in which a plurality of single lenses are combined.

In the optical device for bar-code reading, the light projection lens is composed as a compound lens. The compound lens comprises a plurality of single lenses combined with each other. In this case, typically composing the compound lens so that light can propagate almost in parallel between two lenses will ensure a large allowance for axial dislocation in a direction normal to the optical axis, which is effective in terms of improving production yield and reliability.

The optical device for bar-code reading also may be further modified so that the plurality of single lenses are fitted within a cylinder. They are arranged so that an optical axis of the lenses coincide with an axis of the cylinder, and the cylinder is inserted in the penetrating hole of the light receiving lens.

Since the optical device for bar-code reading is composed so that a plurality of single lenses are fitted within a cylinder and the cylinder is inserted in the penetrating hole of the light receiving lens, a variety of positional adjustments of the lenses will be available, for example, for moving the whole compound lens, previously fabricated so as to arrange the single lenses within the cylinder at regular intervals relative to the penetrating hole, or moving an arbitrary single lens relative to the cylinder while keeping the cylinder fixed in the penetrating hole.

The optical device for bar-code reading may be further modified so that the cylinder is made of a metal.

As for the optical device for bar-code reading, composing the cylinder with a metal can desirably prevent the light which comes from the light emitting element and goes into the compound lens from propagating from an inner circumferential surface of the penetrating hole towards a medium of the receiving lens. Accordingly, it is not probable that the light from the light emitting element will come into the receiving element to cause disturbance. In other words, the receiving element can gain a higher receiving accuracy of the reflected light.

The optical device for bar-code reading of the first aspect of the invention also may be modified so that the light projection lens is a cylindrical single lens.

As for the optical device for bar-code reading, composing the light projection lens with the cylindrical single lens can facilitate the manufacturing thereof as compared with that of the forgoing compound lens. The cylindrical shape allows the light projection lens to be inserted into the penetrating hole, so that the light projection lens is now attachable to the light receiving lens in a manner freely movable along the optical axis without using any other members (the foregoing cylinder, for example).

The optical device for bar-code reading modified as above may be further modified to have a columnar heat sink provided so as to coincide the axis thereof with an optical axis of the light receiving lens. The heat sink has fixed on one end plane thereof the light receiving element and has fixed on the side plane thereof the light emitting element.

In such optical device for bar-code reading, the light receiving element fixed on one end plane of the heat sink opposes with the light receiving lens on the optical axis thereof. This means that the optical device can receive focused light from the light receiving lens in an efficient manner. On the other hand, the light emitting element fixed on the side plane of the heat sink can desirably prevent the light from the light emitting element from going into the entire portion of the light receiving lens, which allows irradiation of the light only in a portion of the receiving lens having incorporated therein the light projection lens. Accordingly, the light emitted from the light emitting element and reflected from a bar code after irradiation can be directly received by the light receiving element attached on the heat sink without the need of a 90° bending of the optical path using a mirror or the like.

A method for manufacturing an optical device for bar-code reading according to the first aspect of the present invention is characterized by comprising the steps of fitting a light projection lens into a penetrating hole formed in a receiving lens so as to penetrate a plane of incidence of light and a plane of outgoing light in a manner freely movable along the optical axis of the light projection lens fixing the light receiving lens after positioning it relative to a light receiving element and fixing the light projection lens after positioning it relative to the positioned and fixed light receiving lens.

In the manufacturing method, the light projection lens is positioned by moving it relative to the light receiving lens after positioning and fixing the light receiving lens relative to the light receiving element. Accordingly, moving the light projection lens to be performed later will never dislocate the light receiving lens, which is positioned in advance. In other words, the individual lenses can be positioned at optimum positions. This allows the individual lenses to be finely positioned, which has not been practical for the conventional, integrated mold lens: and, is can improve accuracy in assembly of the optical device for bar-code reading and in reading while concomitantly attaining downsizing and weight reduction.

A light projection/receiving package according to a second aspect of the present invention is such that for irradiating light emitted from a light emitting element to a target object to be irradiated, and for receiving reflected light from the target object using a light receiving element, it is characterized in that the light emitting element and light receiving element are mounted on front and rear planes of a single die pad.

Since the light projection/receiving package is composed so that the light emitting element and the light receiving element are mounted back to back on the front and rear planes of the single die pad, it is not necessary to keep both areas for mounting the light emitting element and the light receiving element on one plane (on the same plane) of the die pad. This means that it will be sufficient to use a die pad affording a mounting area for the light receiving element, which generally requires a larger mounting area, and this intrinsically allows mounting of the light emitting element on the opposite plane. Accordingly, the die pad in this case ill be smaller than that having on one plane both of the light emitting element and the light receiving element. This successfully results in downsizing and weight reduction of the light projection/receiving package.

The light projection/receiving package according to a third aspect of the present invention is characterized by comprising a die pad a light emitting element and a light receiving element respectively mounted back to back on the front and rear planes of the die pad an optical path bending means provided on one plane of the die pad on which the light emitting element is mounted so as to bend an advancing direction of the emitted light from the light emitting element approximately at right angles and a penetrating hole formed in the die pad so as to allow the light having the advancing direction bent by the optical path bending means to pass through towards the other plane of the die pad on which the light receiving element is mounted.

In the light projection/receiving package, when the light emitted from the light emitting element in a direction parallel to the plane of the die pad comes into the optical path bending means, the optical path thereof is bent approximately at right angles so as to have a direction perpendicular to the plane of the die pad. The directed light passes through the penetrating hole formed in the die pad to thereby reach the plane opposite to that having the light emitting element mounted thereon, that is the plane having mounted thereon the receiving element. Accordingly, the optical path of the light from the light emitting element can be bent towards the opposite plane within a limited area on the die pad plane, without providing any optical means for bending the optical path outside the die pad.

The light projection/receiving package may be modified further to comprise an integrated light projection/receiving lens having integrated therein a source lens portion and a light receiving lens portion that is provided in parallel to the die pad on the side facing to the plane thereof on which the light receiving element is mounted.

In the light projection/receiving package, the light emitted after passing through the penetrating hole is focused by the light projection lens portion and then irradiated to the target object to be irradiated. The reflected light returned back from the target object is focused by the light receiving lens portion and then goes into the light receiving element. In other words, only one integrated light projection/receiving lens portion is responsible for focusing the emitted light and the reflected light, which is beneficial in that it reduces the number of parts for the optical means and the man-hours for the assembly. Since the emitted light and the reflected light are directed perpendicular to the die pad, the light projection/receiving package also is advantageous in that only a simple assembly of the integrated light projection/receiving lens on the die pad in parallel thereto can readily align the center axes of the light projection lens portion and the light receiving lens potion in parallel to the optical axes of the emitted light and the reflected light.

The light projection/receiving package may further be modified so the receiving element is provided in the number of two, the die pad has the penetrating hole between the two light receiving elements, the integrated light projection/receiving lens has the receiving lens portion in the number of two, and the light projection lens portion is formed between the two light receiving lenses.

The light projection/receiving-package has two light receiving elements and two light receiving lens portions on one plane of the die pad, which successfully improves light receiving sensitivity. Since the penetrating hole is formed in the die pad between both light receiving elements and the light projection lens portion is formed between the light receiving lens portions, the package also is advantageous in that it provides the light emitting assembly only within a space for forming the light receiving assembly. Accordingly, such constitution in which the light emitting element and the light receiving element are mounted on the front and rear planes will more efficiently contribute to space saving.

The light projection/receiving package of the third aspect of the invention may be modified so that the package has a front wall in parallel to the die pad on the side facing to the plane thereof on which the light receiving element is mounted-and the light projection lens opposed to the penetrating hole and the light receiving lens opposed to the light receiving element are separately provided on the front wall.

The light projection/receiving package has the light projection lens and the light receiving lens in a separated manner, which is beneficial in that it completely prevents generation of extraneous light (stray light) caused by diffraction or dispersion from the light projection lens portion towards the light receiving lens portion. The extraneous light is likely to generate for a case in which the integrated light projection/receiving lens made of a single kind of medium is used. The separate provision of the light projection lens and the light receiving lens allows material selection and coating to be optimized for the individual lenses, which raises the degree of freedom in lens design and also allows independent positional adjustment thereof, which improves accuracy in the adjustment.

The light projection/receiving package may be modified further to comprise a partition wall formed between the die pad and the front wall of the package so as to isolate an emissive optical path spade between the penetrating hole and the light projection lens from an incident optical path space between the light receiving lens and the light receiving element.

Since the emissive optical path space and the incident optical path space are isolated by the partition wall in the light projection/receiving package, the light emitted from the penetrating hole will never leak from the emissive optical path space to the incident optical path space. This arrangement completely prevents the light emitted from the light emitting element from becoming the extraneous light for the light receiving element. This improves the light receiving sensitivity.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENTS

Preferred embodiments of an optical device for bar-code reading and a method for manufacturing thereof according to the present invention will be detailed hereinafter by referring to the attached drawings.

Figure 1:
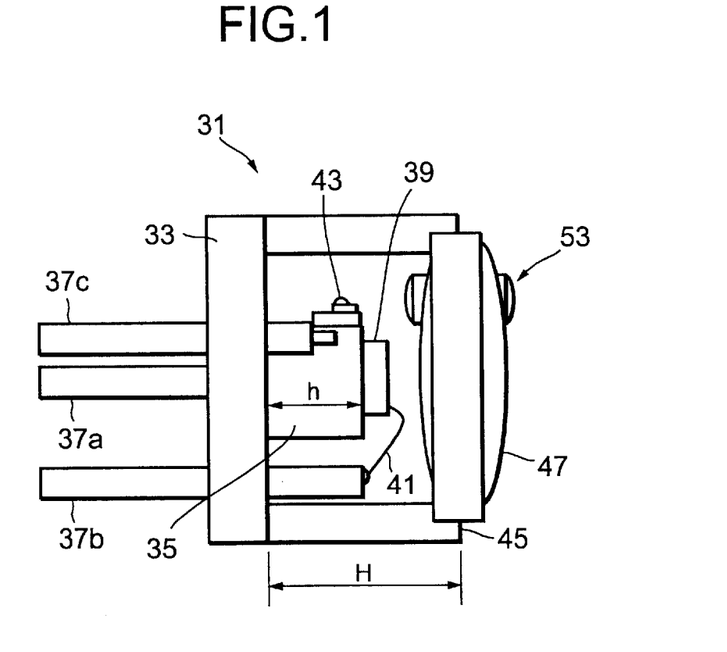
FIG. 1 is a sectional view showing a principal portion of an optical device for bar-code reading according to the present invention.
Figure 2:
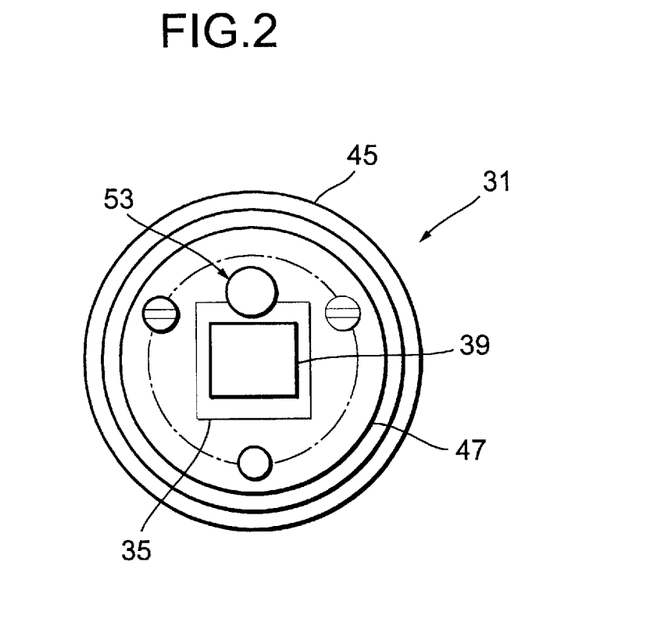
FIG. 2 is a front view of the optical device for bar-code reading shown in FIG. 1.

FIG. 1 is a sectional view showing a principal portion of an optical device for bar-code reading according to the present invention; and, FIG. 2 is a front view of the optical device for bar-code reading shown in FIG. 1.

An optical device for bar-code reading (referred to as "scan engine" hereinafter) 31 according to the present embodiment has an integrated constitution of a light emitting assembly and a light receiving assembly, which have conventionally been separated members. More specifically, on one surface of a disc-formed substrate 33, a heat sink 35 having the form of a square rod is fixed so as to coincide the axis thereof with the center of the substrate. Electrical connection with heat sink 35 is attained by a heat sink lead 37a penetrating substrate 33.

On the end plane of heat sink 35 opposite to the plane fixed to the substrate, a light receiving element 39 is fixed. Receiving element 39 operates so as to essentially receive light coming from the front in an axial direction of heat sink 35 and subject the light to photo-electric conversion. Light receiving element 39 is electrically connected to a light receiving element lead 37b penetrating substrate 33 through a bonding wire 41.

On the other hand, on a side plane of heat sink 35, a light emitting element 43 is fixed. Accordingly, light emitting element 43 and light receiving element 39 are respectively provided on orthogonal planes positioned 90° away from each other. Also, the light emitting element 43 is electrically connected to a light emitting element lead 37c penetrating substrate 33.

On the plane of substrate 33 on which heat sink 35 is fixed, a cylindrical casing 45 having an outer diameter approximately the same as that of substrate 33 is fixed in a concentric manner. That is, heat sink 35, light receiving element 39 and light emitting element 43 are housed in the casing 45. At an opened end (right end in the drawing) of casing 45, a light receiving lens 47 having an outer diameter approximately same as that of the casing 45 is fixed concentrically with heat sink 35. Light receiving lens 47 is responsible for focusing the reflected light from a bar code, not shown, towards light receiving element 39.

Figure 3A:
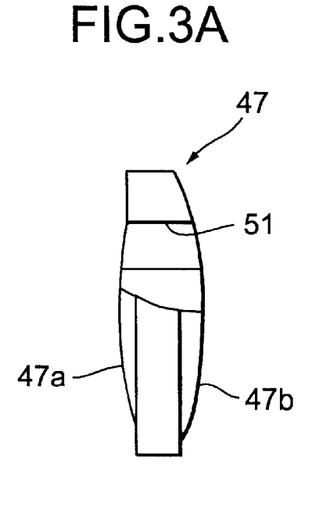
FIGS. 3A and 3B are a partly sectional view and a front view, respectively, of a light receiving lens as a single element shown in FIG. 1.
Figure 3B:
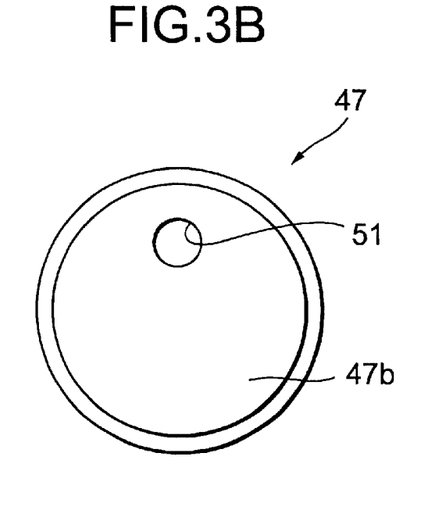
Figure 4A:
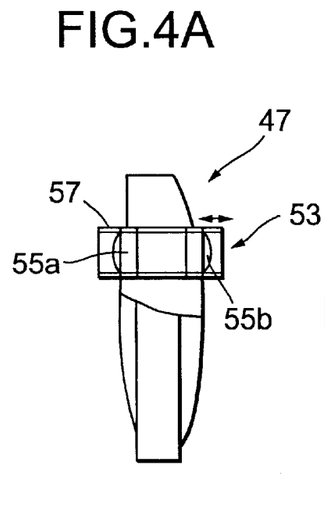
FIGS. 4A and 4B are a partly sectional view and a front view, respectively, of the assembled light receiving lens having inserted therein a light projection lens shown in FIG. 1.
Figure 4B:
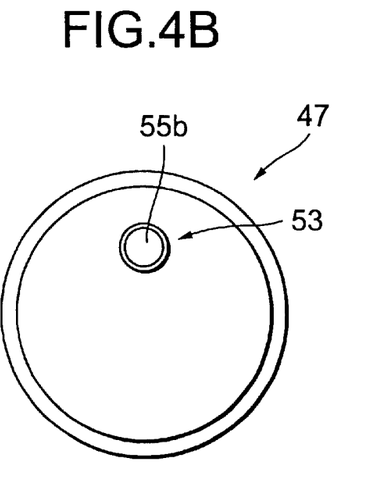
Figure 5A:
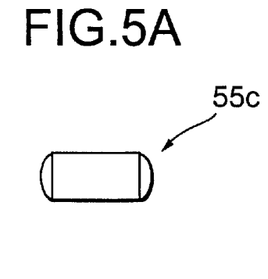
FIGS. 5A and 5B are a partly sectional view and a front view, respectively, of a modified example of the light projection lens as a single element.
Figure 5B:
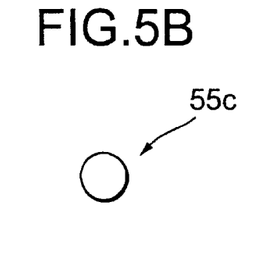

FIGS. 3A and 3B are a partly sectional view and a front view, respectively, of the receiving lens as a single element shown in FIG. 1; FIGS. 4A and 4B are a partly sectional view and a front view, respectively, of the assembled receiving lens having inserted therein a light projection lens shown in FIG. 1; and FIGS. 5A and 5B are a partly sectional view and a front view, respectively, of a modified example of the light projection lens as a single element.

Light receiving lens 47 has formed, in a portion opposing to light emitting element 43, a penetrating hole 51 penetrating a plane of incidence of light 47a and a plane of outgoing of light 47b in parallel to the optical axis. In penetrating hole 51, a light projection lens 53 is inserted.

Light projection lens 53 according to the present embodiment is composed as a compound lens which comprises a plurality of single lenses 55a and 55b. Single lenses 55a and 55b are housed in a cylinder 57 so as to make an optical axes thereof coincide with an axial line. Light projection lens 53 is incorporated into light receiving lens 47 in an integrated manner by inserting cylinder 57 into penetrating hole 51. The light projection lens 53 is composed so that light can propagate in an almost parallel form between two single lenses 55a, 55b, which ensures a large allowance for the dislocation of the axis in a direction perpendicular to the optical axis, and which is beneficial in improving the production yield or reliability.

Before completion of the attachment of light projection lens 53 into light receiving lens 47, the cylinder 57 is fitted to penetrating hole 51 so as to be freely movable along the axial line. It also is allowable for the light projection lens 53 that the single lenses 55a and 55b are fitted so as to be freely movable in the cylinder 57. This allows light projection lens 53 to be adjusted relative to light receiving lens 47 within a movable range of cylinder 57. After light projection lens 53 is properly positioned at a predetermined position, cylinder 57 or single lenses 55a and 55b are fixed using an adhesive or the like.

Since light projection lens 53 is composed so that a plurality of single lenses 55a and 55b are fitted within cylinder 57 and cylinder 57 is inserted in penetrating hole 51 of light receiving lens 47, a variety of positional adjustments of the lenses will be available, for example for moving the whole compound lens, previously fabricated so as to arrange single lenses 55a and 55b within cylinder 57 at regular intervals, relative to the penetrating hole 51, or such that moving arbitrary single lenses 55a and 55b relative to cylinder 57 while keeping cylinder 57 fixed in penetrating hole 51.

Cylinder 57 is preferably composed of a metal material. By composing the cylinder with a metal, light which comes from light emitting element 43 and goes into light projection lens 53 will never propagate from the inner circumferential surface of the penetrating hole 51 towards a medium of the light receiving lens 47. Accordingly, it is not probable that the light from the light emitting element 43 will come into receiving element 39 to cause extraneousness. This means that light receiving element 39 can gain a higher receiving accuracy of the reflected light.

To fabricate the thus composed scan engine 31, light receiving lens 47 is first positioned relative to light receiving element 39. Setting a height h of heat sink 35 above substrate 33 and a height H of casing 45 at predetermined values can affect the positioning. Light projection lens 53 is then adjusted by moving it relative to the thus positioned and fixed light receiving lens 47 and is finally fixed to penetrating hole 51 using an adhesive or the like when a predetermined position is found.

Besides that described in the above, light projection lens 53 can be composed only of a cylindrical single lens 55c, as shown in FIGS. 5A and 5B. Such composition of light projection lens 53 with single lens 55c will facilitate the manufacturing process as compared with that of the compound lens. The cylindrical shape also will be beneficial in that it facilitates the insertion of light projection lens 53 into penetrating hole 51, thus enabling fixation of light projection lens 53 to light receiving lens 47 in a manner freely movable along the optical axis without using any other members (for example, the foregoing cylinder 57).

Figure 6:
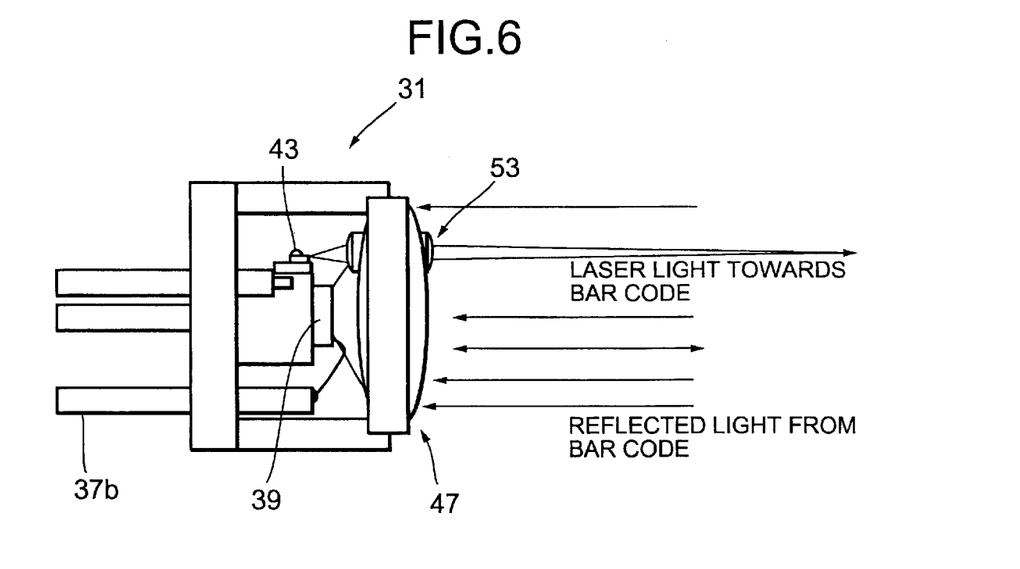
FIG. 6 is a sectional view for explaining an operational status of the optical device for bar-code reading shown in FIG. 1.

FIG. 6 is a sectional view for explaining an operational status of the scan engine shown in FIG. 1. In scan engine 31 according to present embodiment, once the light emitting element 43 is activated by an emission drive circuit not shown, the emitted light is focused by light projection lens 53 and then emitted out from the emission end of such light projection lens 53. The emitted light irradiates a bar code not shown, and then it is reflected by the bar code, directed to light receiving lens 47 to be focused, and received by the light receiving element 39. Light receiving element 39 subjects the received light to photo-electric conversion to thereby convert the bar code pattern into electric signals and then outputs them through light receiving element lead 37b. A not shown computer then processes the output signals for decoding.

As has been described in the above, in scan engine 31, or the optical device for bar-code reading according to the present invention, the space for mounting light receiving lens 47 intrinsically contains the space for mounting light projection lens 53, since penetrating hole 51 is formed in the light receiving lens 47 and light projection lens 53 is inserted into penetrating hole 51. Accordingly, it is not necessary to keep space mounting for every lens, which results in downsizing and weight reduction. In addition, it allows the selection of a material and a coating optimized for each lens to thereby raise the degree of freedom in the design. It also is advantageous since the relative position of the light projection lens 53 and light receiving lens 47 can be adjusted, and positional errors of the individual lenses relative to the individual elements (light emitting element 53 and light receiving element 47) can surely be absorbed (minimized).

Figure 7:
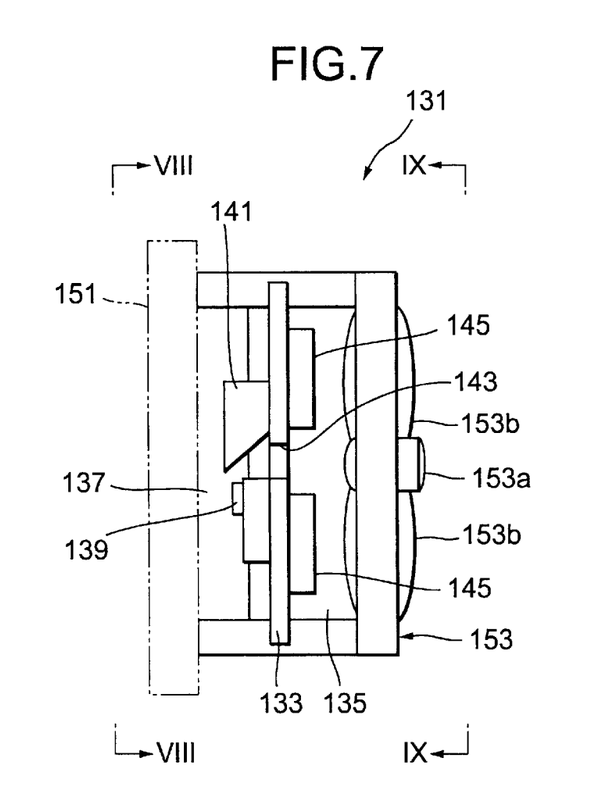
FIG. 7 is a sectional view of a first embodiment of a light projection/receiving package according to the present invention.
Figure 8:
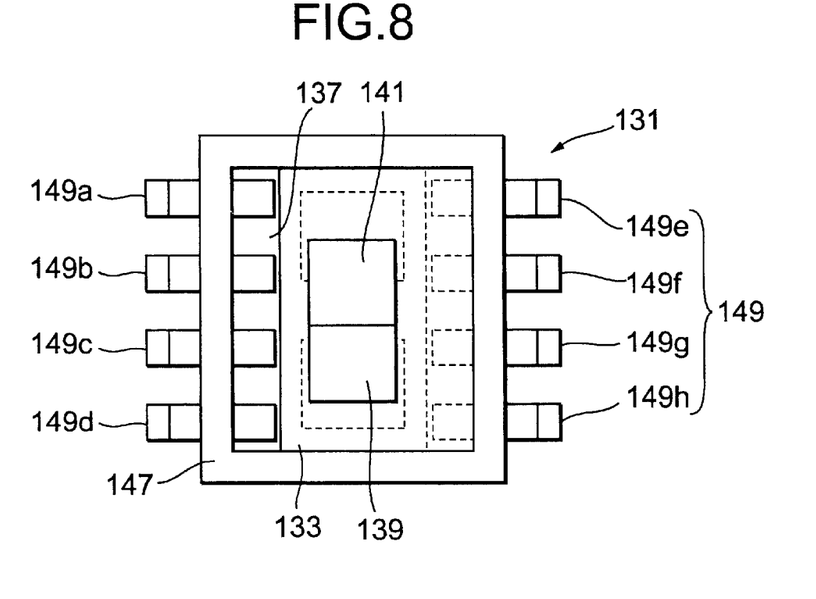
FIG. 8 is a drawing taken along the VIII—VIII line in FIG. 7.
Figure 9:
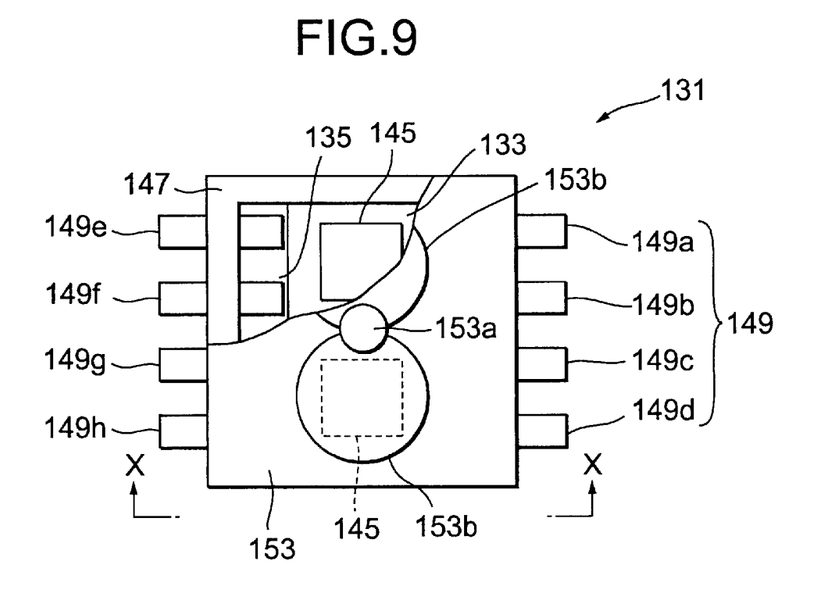
FIG. 9 is a drawing taken along the IX—IX line in FIG. 7.
Figure 10:
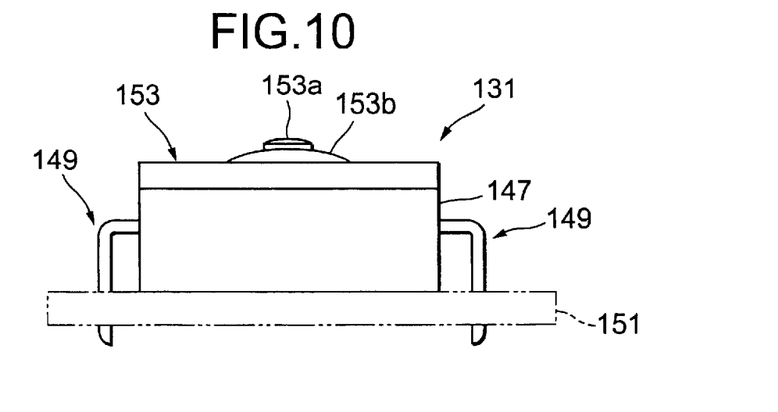
FIG. 10 is a drawing taken along the X—X line in FIG. 9.

Preferred embodiments of a light projection/receiving package for bar-code reading according to a second aspect of the present invention will be detailed hereinafter referring to the attached drawings. FIG. 7 is a sectional view of a first embodiment of a light projection/receiving package according to the present invention; FIG. 8 is a drawing taken along the VIII—VIII line in FIG. 7; FIG. 9 is a drawing taken along the IX—IX line in FIG. 7; and FIG. 10 is a drawing taken along the X—X line in FIG. 9.

A light projection/receiving package 131 typically has a resin-made outer shell having the form of square-sectioned pipe opened at both ends. The light projection/receiving package 131 has inside thereof a die pad 133 which isolates an inner housing space of the light projection/receiving package 131 into a front housing chamber 135 and a rear housing chamber 137. The rear housing chamber 137 houses a light emitting element 139 mounted on a rear plane of the die pad 133. The light emitting element 139 has a monitoring PD (photodiode), not shown, for controlling the laser output to a predetermined level.

In the vicinity of light emitting element 139, an optical path bending means (fixed 45° mirror) 141 for bending an advancing direction of light emitted from the light emitting element 139 approximately by the 90° is mounted. Substituting fixed 45° mirror 141 with a prism also can give a similar optical path. In the vicinity of fixed 45° mirror 141, a penetrating hole 143 penetrating die pad 133 is formed, which allows the light, having its advancing direction already bent by fixed 45° mirror 141, to pass through towards the opposite (front) plane of die pad 133 (the right side in FIG. 7).

Light projection/receiving package 131 has two light receiving elements 145 in order to improve receiving sensitivity. More specifically, front housing chamber 135 houses two light receiving elements 145 mounted on a front plane of die pad 133. In other words, light projection/ receiving package 131 houses light emitting element 139 and light receiving elements 145 arranged back to back on die pad 133. Foregoing penetrating hole 143 formed in die pad 133 is located between two light receiving elements 145.

As shown in FIGS. 8 and 9, light projection/receiving package 131 has a plurality of leads 149 penetrating both side planes of a wall portion 147 and projecting out therefrom (4 leads each from the left and right planes, total 8 leads, in this embodiment). Four leads 149a, 149b, 149c and 149d, projected out from one side plane, exposed only in the rear housing chamber 137 and are connected to the individual electrodes of light emitting element 139. Another four leads 149e, 149f, 149g and 149h, projected out from the opposite side plane, are exposed only in front housing chamber 135 and are connected to the individual electrodes of light receiving elements 145 through bonding wires. The electrodes of light emitting element 139 and light-receiving element 145 are thus drawn out from light projection/receiving package 131 via leads 149.

Light projection/receiving package 131 can typically be mounted on a circuit board 151, as shown in FIG. 10, in which all leads 149 are bent backward at right angles, and connected and fixed to a circuit formed on circuit board 151 using solder or the like.

Since leads 149a, 149b, 149c and 149d connected to light emitting element 139 are exposed only in rear housing chamber 137 which houses light emitting element 139, and leads 149e, 149f, 149g and 149h connected to receiving elements 145 are exposed only in front housing chamber 135 which houses receiving elements 145 even a small housing space can successfully improve the isolating property between emitting element leads 149a, 149b, 149c and 149d and light receiving element leads 149e, 149f, 149g and 149h.

Light projection/receiving package 131 supports an integrated light projection/receiving lens 153, which comprises a light projection lens portion 153a and two receiving lens portions 153b integrated therewith, in parallel to die pad 133 on the side facing to the plane thereof on which light receiving elements 145 are mounted. Integrated light projection/receiving lens 153 is composed by forming two light receiving lens portions 153b and forming one light projection lens portion 153a between them.

Integrated light projection/receiving lens 153 can be formed using transparent resin such as polycarbonate or glass. Integrated light projection/receiving lens 153 is designed so as to be positioned and fixed in parallel to die pad 133 by placing it on the opened end of front housing chamber 135 and by fixing with an adhesive. Integrated light projection/receiving lens 153 is responsible for focusing the light emitted through penetrating hole 143 to thereby irradiate a bar code using light projection lens portion 153a for focusing the reflected light returned from the bar code to thereby direct the light towards light receiving elements 145 using light receiving lens portions 153b. In other words, only one integrated light projection/receiving lens 153 is responsible both for focusing the emitted light and for focusing the reflected light. The integrated light projection/receiving lens 153 also is advantageous in that facilitating the assembly thereof by simply placing it on the opened end of the casing wall thereby align itself in parallel to die pad 133, so as to align the center axes of light projection lens portion 153a and the light receiving lens portion 153b in parallel to the optical axes of the emitted light and the reflected light.

Figure 11:
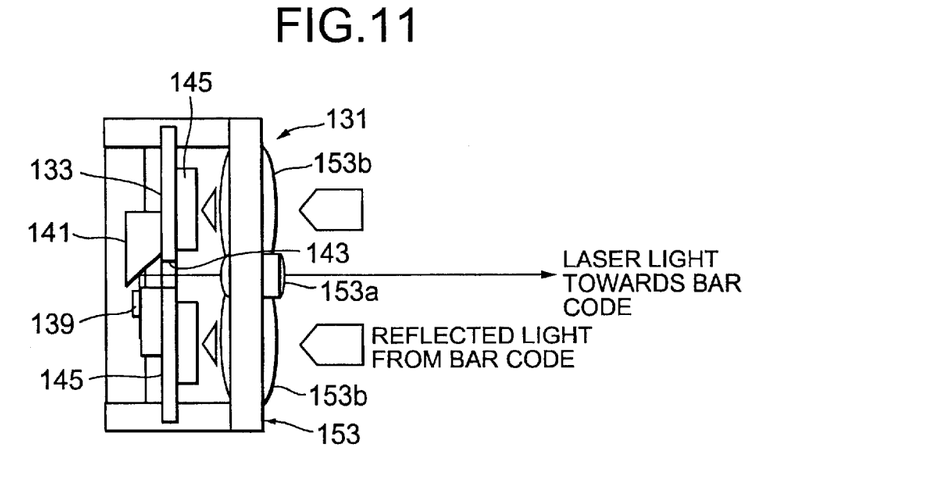
FIG. 11 is a drawing for explaining the operation of the light projection/receiving package shown in FIG. 7.

FIG. 11 is a drawing for explaining the operation of the light projection/receiving-package 131 shown in FIG. 7. In light projection/receiving package 131, the light emitted from light emitting element 139 changes advancing direction by 90° with the aid of fixed 45° mirror 141, passes through the penetrating hole 143, is focused by light projection lens portion 153a of integrated light projection/receiving lens 153 and is emitted. The emitted light is then reflected on a mirror of a scan mirror, not shown, and allowed to irradiate a bar code.

The light irradiated to the bar code returns back to the mirror with an intensity variation caused by the black-and-white pattern of the bar code while being affected by some irregular reflection, the light reflected there then goes into the light receiving lens portions 153b of the integrated light projection/receiving lens 153. The light that goes into receiving lens portions 153b is focused and is then received by light receiving elements 145. Light receiving elements 145 subject the light to photo-electric conversion to thereby convert the bar code pattern into electric signals and then output them through leads 149e, 149f, 149g, and 149h. A not shown computer receives the output signals and processes them for decoding the bar code information.

Since light projection/receiving package 131 is composed so that light emitting element 139 and light receiving elements 145 are mounted back to back on the front and rear planes of the single die pad 133, it is not necessary to keep both areas for mounting the light emitting element 139 and light receiving elements 145 on one plane (same plane) of die pad 133. That is, it will be sufficient to use die pad 133 affording a mounting area for light receiving elements 145, which generally require a larger mounting area, and this intrinsically allows mounting of light emitting element 139 on the opposite plane. Accordingly, die pad 133 in this case can be downsized by the area for mounting light emitting element 139, which successfully results in downsizing and weight reduction of light projection/receiving package 131.

Since the optical path of the light emitted from light emitting element 139 is bent approximately at right angles by fixed 45° mirror 141, and this bent light is directed through penetrating hole 143 towards the opposite side of die pad 133, it is no more necessary to provide any optical means for bending the optical path outside the die pad 133, and the change in the optical path of the light from light emitting element 139 towards the opposite side can be accomplished only in a limited area on the die pad plane.

Light projection/receiving package 131 provided with the two light receiving elements 145 and two light receiving lens portions 153b on one plane of the die pad 133 successfully improves the receiving sensitivity. Since penetrating hole 143 is formed in die pad 133 between both of light receiving elements 145, and light projection lens portion 153a is formed between receiving lens portions 153b, the package also is advantageous in that it provides the light emitting assembly only within the space for forming light receiving assembly. Accordingly, the constitution in which light emitting element 139 and the light receiving elements 145, are mounted on the front and rear planes will contribute more efficiently to the space saving. More specifically, the package of the present embodiment having two or more light receiving elements 145 for a single light emitting element 139 will exhibit a more distinctive space-saving effect as compared with that exhibited by the package having only one light receiving element 145 for a single light emitting element 139.

Figure 12:
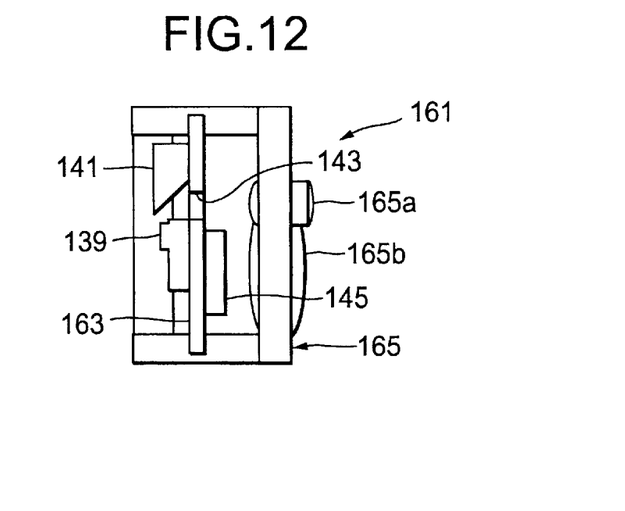
FIG. 12 is a sectional view showing a second embodiment of the light projection/receiving package according to the present invention.
Figure 13:
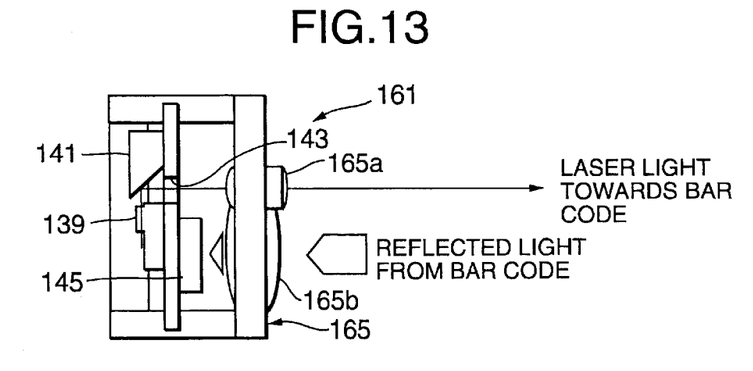
FIG. 13 is a drawing for explaining the operation of the optical device for bar-code reading shown in FIG. 12.

The next paragraphs will describe a second embodiment of the light projection/receiving package according to a second aspect of the present invention. FIG. 12 is a sectional view showing a second embodiment of the light projection/receiving package according to the present invention, and FIG. 13 is a drawing for explaining the operation of the optical device for bar-code reading shown in FIG. 12. It should now be noted that members similar to those shown in FIGS. 7 to 12 will have the same reference numerals and will not be detailed again.

In a light projection/receiving package 161 according to the present embodiment, a light emitting-element 139 and a fixed 45° mirror 141 are mounted on a rear plane of a die pad 163, the die pad 163 has formed therein a penetrating hole 143, and a light receiving element 145 is mounted on a front plane of die pad 163. Over the front plane of die pad 163, an integrated light projection/receiving lens 165, which comprises one light projection lens portion 165a and one light receiving lens portion 165b, is opposed in parallel to the die pad 163. In other words, the light projection/receiving package 161 has an all-in-one structure containing light receiving element 145 and light receiving lens portion 165b for focusing the reflected light onto light receiving element 145.

Also, in light projection/receiving package 161 shown in FIG. 13, light emitted from light emitting element 139 has its advancing direction changed 90° by a fixed 45° mirror 141, passes through the penetrating hole 143, is focused by light projection lens portion 165a of integrated light projection/receiving lens 165, and then is emitted. The emitted light is then reflected on a mirror of a scan mirror, not shown, and allowed to irradiate a bar code. The light irradiated on the bar code plane returns back to the mirror, goes into light receiving lens portion 165b of integrated light projection/receiving lens 165 to be focused, and then is received by light receiving element 145.

Although light projection/receiving package 161 will be slightly lower in receiving sensitivity than light projection/receiving package 131, die pad 163 and integrated light projection/receiving lens 164 can be made smaller, which promotes further downsizing and weight reduction.

Figure 14:
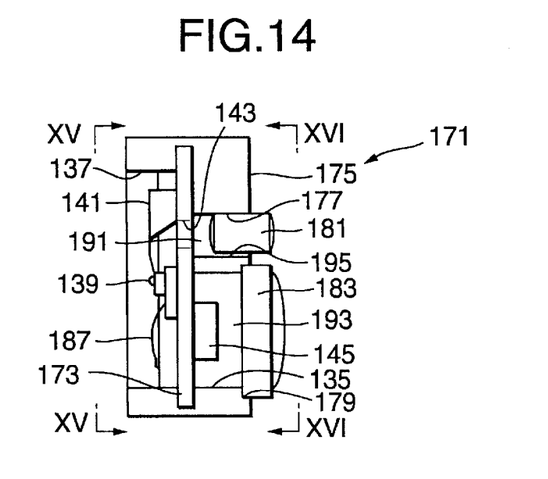
FIG. 14 is a sectional view showing a third embodiment of the light projection/receiving package according to the present invention.
Figure 15:
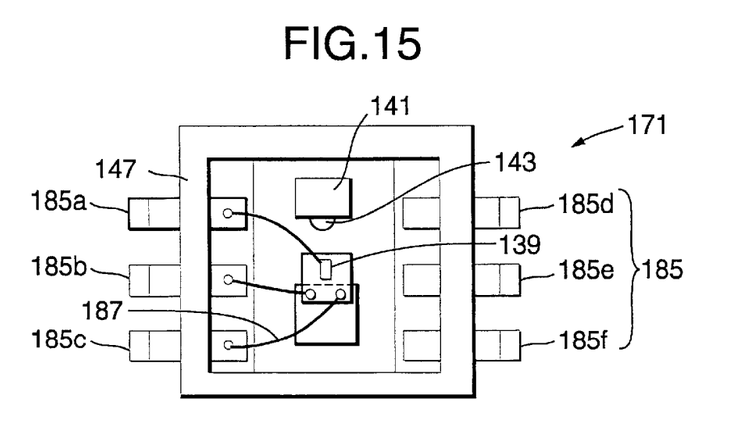
FIG. 15 is a drawing taken along the XV—XV line in FIG. 14.
Figure 16:
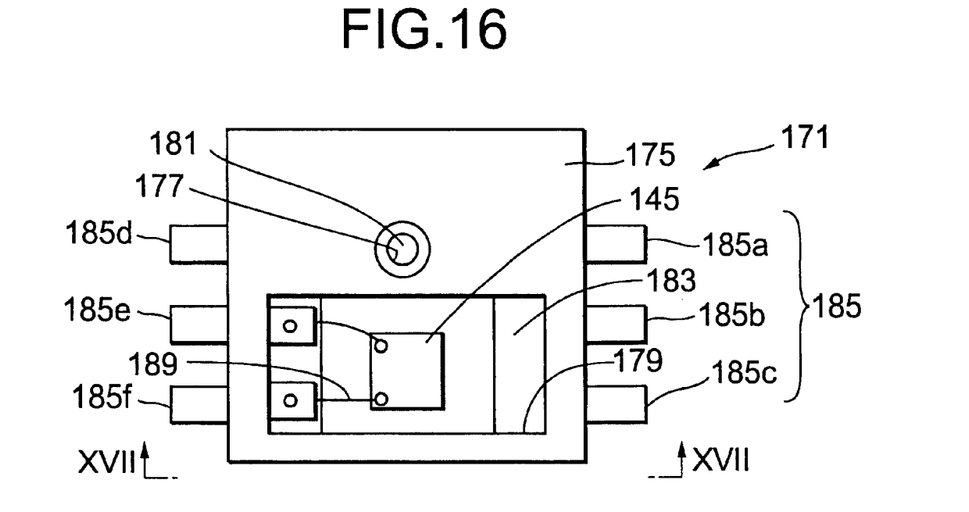
FIG. 16 is a drawing taken along the XVI—XVI line in FIG. 14.
Figure 17:
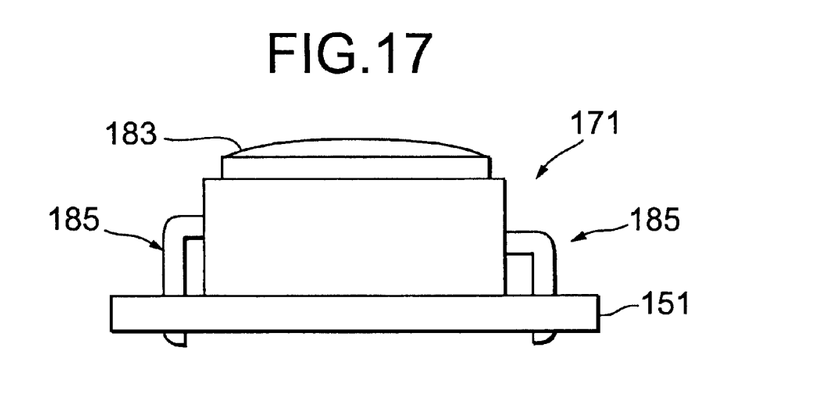
FIG. 17 is a drawing taken along the XVII—XVII line in FIG. 16.

A third embodiment of the light projection/receiving package according to a second aspect of the present invention will be described. FIG. 14 is a sectional view showing a third embodiment of the light projection/receiving package according to the present invention. FIG. 15 is a drawing taken along the XV—XV line in FIG. 14. FIG. 16 is a drawing taken along the XVI—XVI line in FIG. 14. FIG. 17 is a drawing taken along the XVII—XVII line in FIG. 16. It should now be noted that members similar to those shown in FIGS. 7 to 11 will have the same reference numerals and will not be detailed again.

A light projection/receiving package 171 according to the present embodiment, shown in FIGS. 14 and 15, has a die pad 173, on a rear plane of which the light emitting element 139 and a fixed 45° mirror 141 are mounted, die pad 173 itself has a penetrating hole 143 formed therein, and on the front plane of which one light receiving element 145 is mounted.

On the side facing to the plane of die pad 173 on which the light receiving element 145 is mounted, a front package wall 175 is provided in parallel to die pad 173. As shown in FIG. 16, front package wall 175 has a light projection lens attachment hole 177 aligned concentrically with penetrating hole 143 and a square light receiving window 179 for allowing receiving element 145 to be expose. Front package wall 175 has a light projection lens 181 and a light receiving lens 183, which are provided as separate members, and which are attached to light projection lens attachment hole 177 and light receiving window 179, respectively.

Light projection lens attachment hole 177 has formed thereto a fitting portion for the convenience of attaching light projection lens 181. Light projection lens 181 is slid along the axial direction of the fitting portion to complete a necessary focus adjustment, and the outer periphery thereof is then fixed by adhesion to the fitting portion. This ensures the agreement of optical axes and focal points between light emitting element 139 and light projection lens 181 in a simple and accurate manner. Also, light receiving window 179 has formed a fitting portion for the convenience of attaching light receiving lens 183. By fitting light receiving lens 183 to the fitting portion, the optical axis and focus of light receiving lens 183 will readily be agreed with those of light receiving element 145.

As shown in FIGS. 15 and 16, light projection/receiving package 171 has six leads 185 in total, in which three leads penetrate wall portion 147 on each side. Three leads 185a, 185b and 185c projected out from one side plane expose only in a rear housing chamber 137 and are connected through bonding wires 187 to the individual electrodes of the light emitting element 139. Another three leads 185d, 185e, and 185f projected out from the opposite side plane expose only in a front housing chamber 135 and are connected to the individual electrodes of the light receiving element 145 through bonding wires 189.

Light projection/receiving package 171 can typically be mounted on a circuit board 151, as shown in FIG. 17, in which all leads 153 are bent backward at right angles, and connected and fixed to a circuit formed on circuit board 151 using solder or the like.

Light projection/receiving package 171 has a partition wall 195 formed between die pad 173 and front package wall 175 so as to isolate an emissive optical path space 191 between penetrating hole 143 and light projection lens 181 from an incident optical path space 193 between light receiving lens 183 and light receiving element 145. Accordingly, the light emitted form light emitting element 139 and reaching the emissive optical path space 191 after passing through penetrating hole 143 will never leak into the incident optical path space 193.

Figure 18:
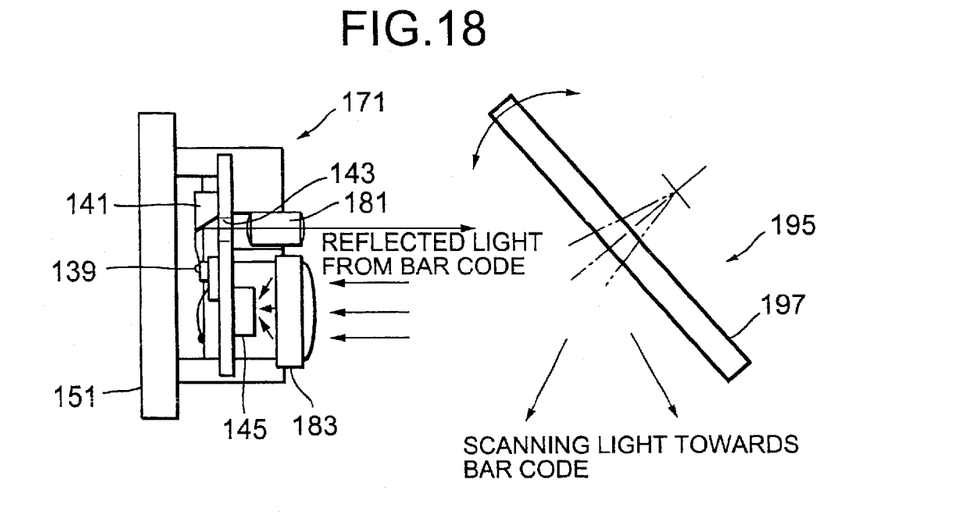
FIG. 18 is a drawing for explaining the operation of the light projection/receiving package shown in FIG. 14.

FIG. 18 is a drawing for explaining the operation of light projection/receiving package 171 shown in FIG. 14. In composed light projection/receiving package 171, the light emitted from light emitting element 139 changes its advancing direction by 90° with the aid of fixed 45° mirror 141, passes through penetrating hole 143, is focused by light projection lens 183, and then is emitted. The emitted light is then reflected on a mirror 197 of a scan mirror 196 and allowed to irradiate a bar code not shown.

The light irradiated to the bar code returns back to mirror 197 with an intensity variation caused by the black-and-white pattern of the bar code while being affected by some irregular reflection, the light reflected there then goes into light receiving lens 183. The reflected light that went into light receiving lens 183 is focused and is then received by light receiving element 145. Light receiving element 145 subjects the light to photo-electric conversion to thereby convert the bar code pattern into electric signals and then outputs them through the leads 185d, 185e, and 185f.

Light projection/redeiving package 171 has not only the basic effect of attaining a downsizing and a weight reduction similarly to light projection/receiving packages 131 and 151 according to the first and second embodiments, but it also has the effect of completely preventing the generation of extraneous light (stray light) caused by diffraction or dispersion from the light projection lens portion towards the receiving lens portion, which extraneous light is likely to generate in a case where an integrated light projection/receiving lens made of a single kind of medium is used, since light projection lens 181 and light receiving lens 183 are provided separately. Such separate provision of light projection lens 181 and light receiving lens 183 also allows material selection and coating to be optimized by the individual lenses, which raises the degree of freedom in the lens design and also still allows independent positional adjustment thereof, which improves accuracy in the adjustment.

Since emissive optical path space 191 and the incident optical path space 193 are isolated by partition wall 195, the light emitted from penetrating hole 143 will never leak from emissive optical path space 191 to the incident optical path space 193, which completely prevents the light emitted from light emitting element 139 from becoming the extraneous light for light receiving element 145. This improves the receiving sensitivity.

What is claimed is:

1. An optical device for bar-code reading comprising:
   a light emitting element;
   a light projection lens for focusing light from said light emitting element so as to irradiate a bar code;
   a light receiving lens for focusing reflected light from the bar code and having formed therein a penetrating hole which penetrates a plane of incidence of light and a plane of outgoing of light, in which said light projection lens is inserted; and
   a light receiving element for receiving the light focused by said light receiving lens to perform photo-electric conversion.

2. The optical device for bar-code reading as claimed in claim 1, wherein said light projection lens is a compound lens in which a plurality of single lenses are combined.

3. The optical device for bar-code reading as claimed in claim 2, wherein said plurality of single lenses are fitted within a cylinder so that an optical axis of said lenses coincides with an axis of said cylinder, and said cylinder is inserted into said penetrating hole of said light receiving lens.

4. The optical device for bar-code reading as claimed in claim 3, wherein said cylinder is made of a metal.

5. The optical device for bar-code reading as claimed in claim 1, wherein said light projection lens is a cylindrical single lens.

6. The optical device for bar-code reading as claimed in any one of claim 1 to 5, further comprising a columnar heat sink provided to coincide an axis thereof with an optical axis of said light receiving lens, wherein said heat sink has fixed on one end plane thereof said light receiving element, and has fixed on a side plane thereof said light emitting element.

7. A method for manufacturing an optical device for bar-code reading, comprising the steps of:
   fitting a light projection lens into a penetrating hole formed in a light receiving lens to penetrate a plane of incidence of light and a plane of outgoing of light in a manner freely movable along an optical axis of said light projection lens;
   fixing said light receiving lens after positioning said light receiving relative to a light receiving element; and
   fixing the light projection lens after positioning the light projection lens relative to said positioned and fixed light receiving lens.

8. A light projection/receiving package comprising:
   a die pad;
   a light emitting element and a light receiving element respectively mounted back to back on front and rear planes of said die pad;
   an optical path bending means provided on one plane of said die pad on which said light emitting element is mounted to bend an advancing direction of the emitted light from said light emitting element approximately at right angles; and
   a penetrating hole formed in said die pad to allow the light having the advancing direction bent by said optical path bending means to pass through towards the other plane of said die pad on which said receiving element is mounted.

9. The light projection/receiving package as claimed in claim 8, further comprising an integrated light projection/receiving lens having integrated therein a light projection lens portion and a light receiving lens portion, which is provided in parallel to said die pad on the side facing the plane on which said light receiving element is mounted.

10. The light projection/receiving package as claimed in claim 9, wherein said light receiving element includes two receiving elements;
   said die pad has said penetrating hole between said two receiving elements; and
   said integrated light projection/receiving lens includes said light receiving lens having two receiving lenses, and said light projection lens portion is formed between said two receiving lenses.

11. The light projection/receiving package as claimed in claim 8, wherein said package has a front wall in parallel to said die pad on the side facing the plane on which said light receiving element is mounted; and
   said light projection lens opposed to said penetrating hole and said light receiving lens opposed to said light receiving element are separately provided on said front wall.

12. The light projection/receiving package as claimed in claim 11, further comprising a partition wall formed between said die pad and said front wall of said package to isolate an emissive optical path space between said penetrating hole and said light projection lens from an incident optical path space between said light receiving lens and said light receiving element.

* * * * *